March 13, 1956  R. J. HARKENRIDER  2,738,242
TRACTION MOTOR LUBRICATOR

Filed March 2, 1953  6 Sheets-Sheet 1

INVENTOR.
Robert J. Harkenrider
BY
Mann, Brown and Hartmann
Attys

March 13, 1956  R. J. HARKENRIDER  2,738,242
TRACTION MOTOR LUBRICATOR

Filed March 2, 1953  6 Sheets-Sheet 2

INVENTOR.
Robert J. Harkenrider
BY
Mann Brown and Hausmann
Attys

March 13, 1956  R. J. HARKENRIDER  2,738,242
TRACTION MOTOR LUBRICATOR

Filed March 2, 1953  6 Sheets-Sheet 3

INVENTOR.
Robert J. Harkenrider
BY
Mann, Brown and Hansmann
Attys

March 13, 1956 R. J. HARKENRIDER 2,738,242
TRACTION MOTOR LUBRICATOR
Filed March 2, 1953 6 Sheets-Sheet 4

INVENTOR.
Robert J. Harkenrider
BY
Mann, Brown and Hansmann
Attys.

March 13, 1956 R. J. HARKENRIDER 2,738,242
TRACTION MOTOR LUBRICATOR
Filed March 2, 1953 6 Sheets-Sheet 5

INVENTOR.
Robert J. Harkenrider
BY
Mann, Brown and Hausmann
Attys

March 13, 1956 R. J. HARKENRIDER 2,738,242
TRACTION MOTOR LUBRICATOR
Filed March 2, 1953 6 Sheets-Sheet 6
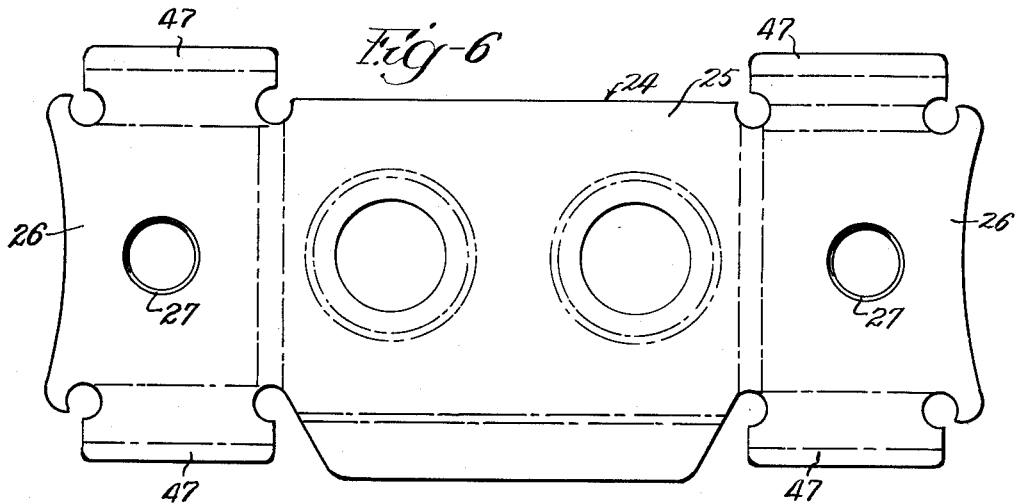
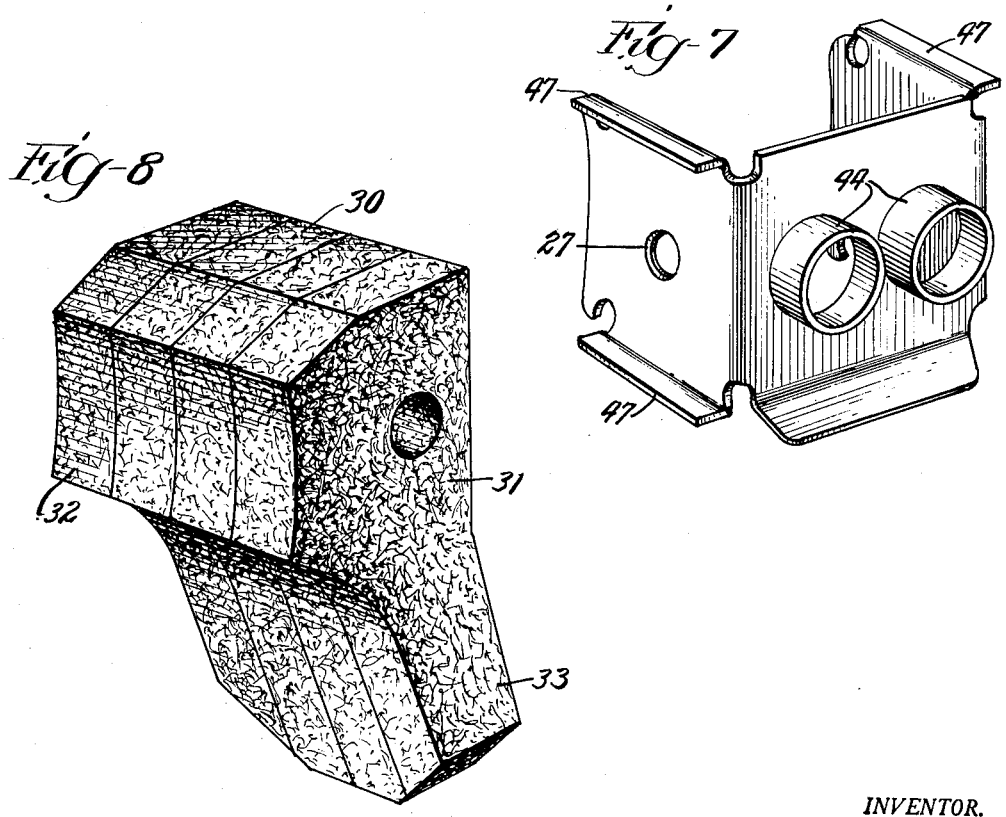
INVENTOR.
Robert J. Harkenrider
BY
Mann, Brown and Hansmann
Attys.

United States Patent Office 2,738,242
Patented Mar. 13, 1956

2,738,242
TRACTION MOTOR LUBRICATOR

Robert J. Harkenrider, Winona, Minn., assignor to Gladys D. Miller, Winona, Minn.

Application March 2, 1953, Serial No. 339,577

6 Claims. (Cl. 308—132)

This invention relates to lubricators for traction motor suspension bearings of diesel locomotives used in high-speed train service. Those locomotives are powered by diesel engines connected to an electric generator, which furnishes current to operate electric traction motors geared to the truck axles of the driving wheels and suspended from them. The motor suspension bearings are subjected not only to the transmission of enormous driving power but to terrific vibration of the axles caused by the wheels passing over irregularities in the track, and ample lubrication is a necessity that has been difficult to supply and maintain.

The motor suspension bearings usually include a detachable axle cap having an oil chamber or reservoir and means intended to conduct that oil to and supply it to the journal.

This invention relates to an improved means for that purpose, and has for its principal object to provide a simple, rugged assembly adapted to be made fast to the cover plate of an axle cap and to adjust itself automatically in correct position to lift oil from the reservoir and apply it to the journal through a window opening in the bearing liner.

Generally speaking, this is accomplished by mounting a porous lubricating body in a holder resiliently urged toward the journal from a base made fast to the cover plate of the axle cap.

Further objects and advantages of the invention will be apparent as the disclosure proceeds and the description is read in connection with the drawings, in which:

Fig. 6 is a plan view of the blank used in making the trough or holder for the felt body;

Fig. 7 is a perspective view of the trough or holder seen from the opposite side of that shown in Fig. 4; and Fig. 8 is a perspective view of the felt lubricating body.

But these diagrammatic drawings and the corresponding description are used for the purpose of disclosure only.

Figure 1:
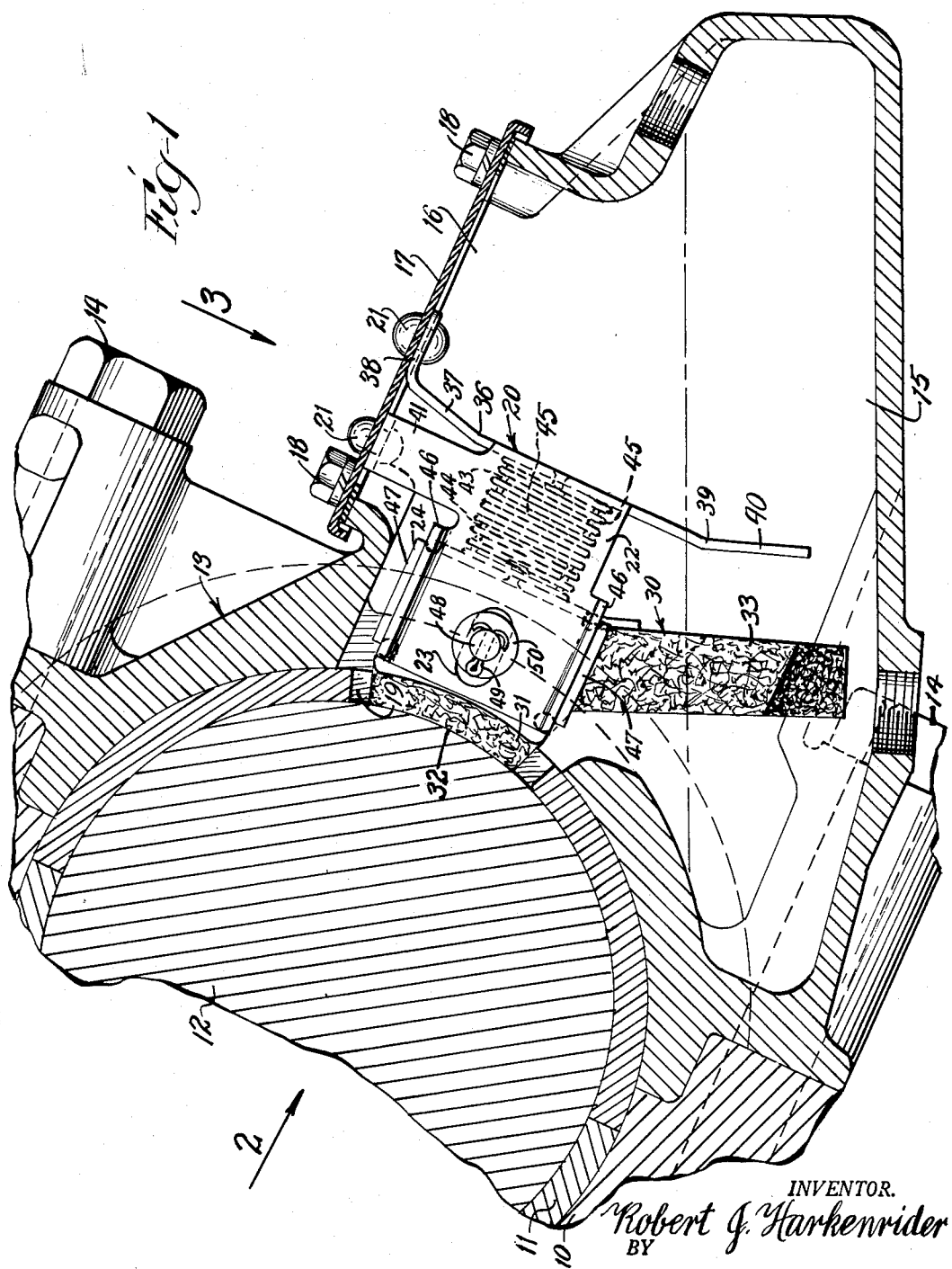
Fig. 1 is a transverse section through the journal, the axle cap, and the lubricating device.

In Fig. 1, the reference numeral 10 indicates a fragment of a motor suspension bearing provided with a liner 11 for a wheeled axle 12. Associated with these is a special motor suspension bearing cap or axle cap 13 secured in place by bolts 14 and provided with an oil reservoir 15 and an inspection opening 16 for the reservoir, which is normally closed by a cover plate 17 made fast by cap screws 18.

The lubricator forming the subject matter of this invention is to lift oil from the reservoir 15 and apply it to the axle 12 through the small window opening 19 in the liner 11.

General description of lubricator

The lubricator includes a base 20 (Figs. 1 and 4) secured to the cover plate 17 by rivets 21 and having spaced side members 22 provided with elongated slots 23 and adapted to receive between them a trough or holder 24 (Fig. 4) including a back 25 and side walls 26 provided with aligned openings 27 adapted to receive the reduced ends 28 of a bushing 29 for a group of felt bodies 30 (Fig. 8) received between the side walls 26 and including thick portions 31 each having a rounded surface 32 to fit against the surface of the axle 12 to be lubricated and a depending wick 33 adapted to dip into and raise the oil in the reservoir 15.

The base

Figure 4:
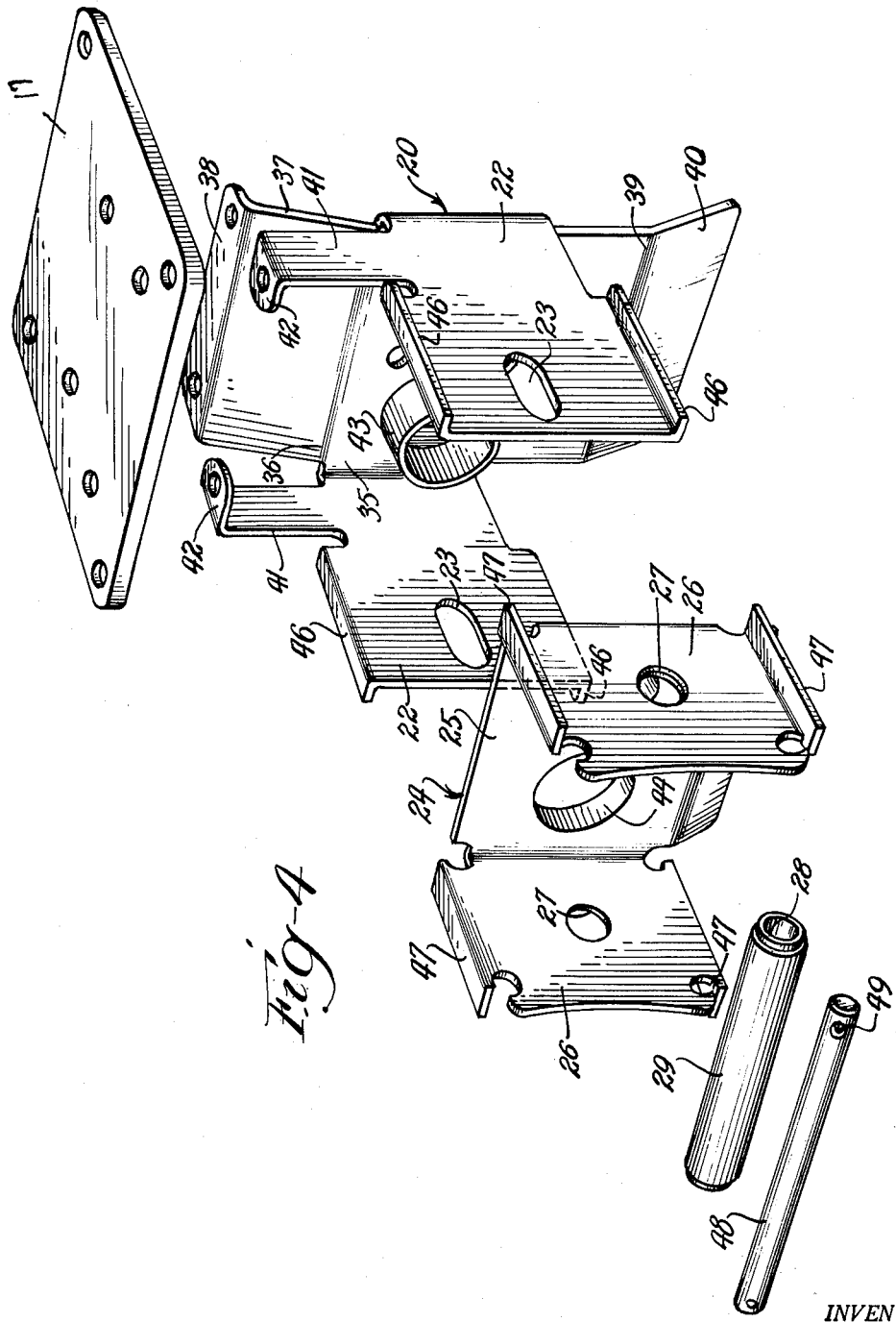
Fig. 4 is a perspective view of several parts of the lubricator slightly displaced from their assembled positions.
Figure 5:
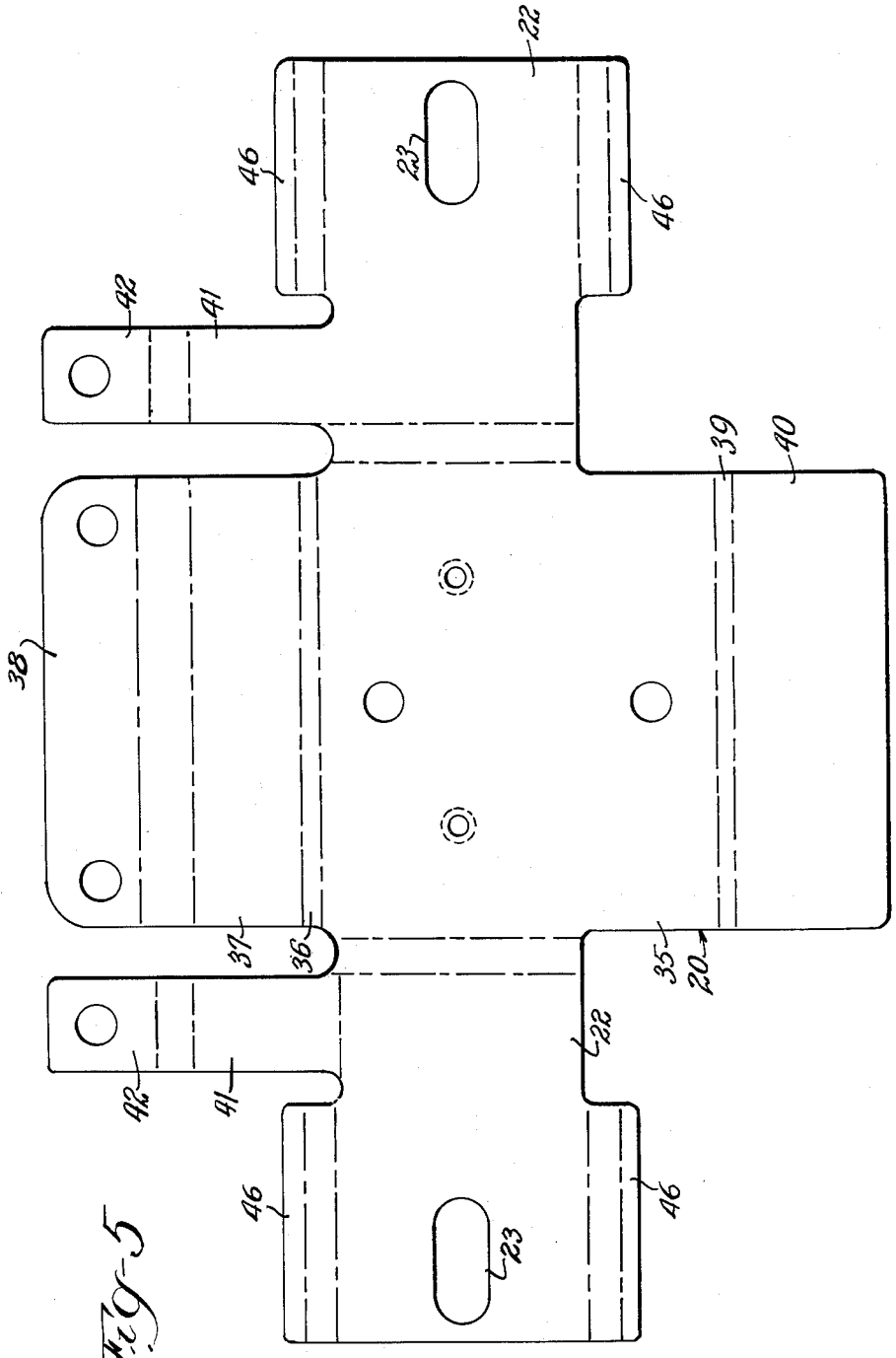
Fig. 5 is a plan view of the blank used in making the base of the device.

The base 20 of the lubricator includes an oblong body portion 35 (Figs. 4 and 5) and side portions which become side members 22 when formed up as indicated at the right in Fig. 4. The upper part of the body portion 35 is bent at 36 to make a leg 37 having a foot 38 secured to the cover plate 17 by rivets 21. The lower portion of the body 35 is bent at 39 to form a substantially vertical wall 40 and makes the back of the base serve as an oil baffle.

Each side member 22 has a portion which becomes an arm 41 having a finger 42 also secured to the cover plate 17 by rivets 21.

The trough

The trough 24 has a body portion 25 which becomes the back of the trough and side portions which become the side walls 26.

The body portions 35 of the base and 25 of the trough are provided with oppositely directed spring guides 43 and 44 for helical springs 45, which urge the trough and therefore the felt body 30 toward the axle to press constantly the curved surfaces 32 against it.

Figure 2:
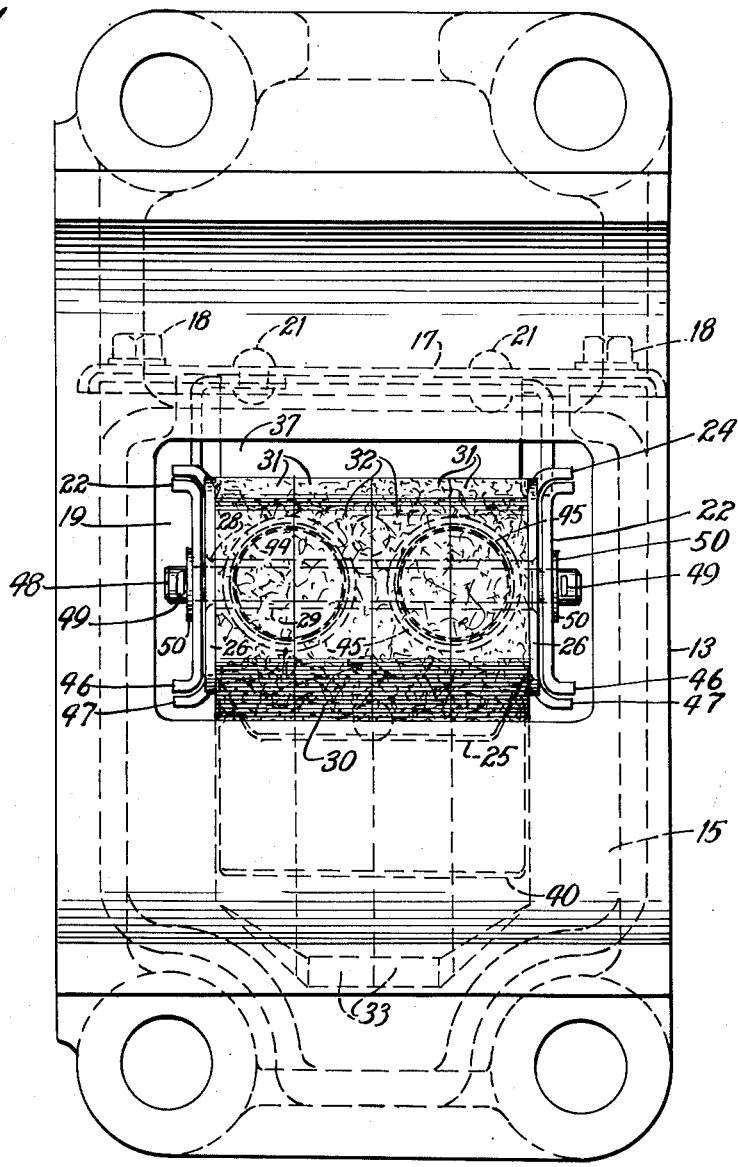
Fig. 2 is an elevation of the axle cap and lubricating device looking in the direction of the arrow 2 on Fig. 1 with the bearing liner removed.
Figure 3:
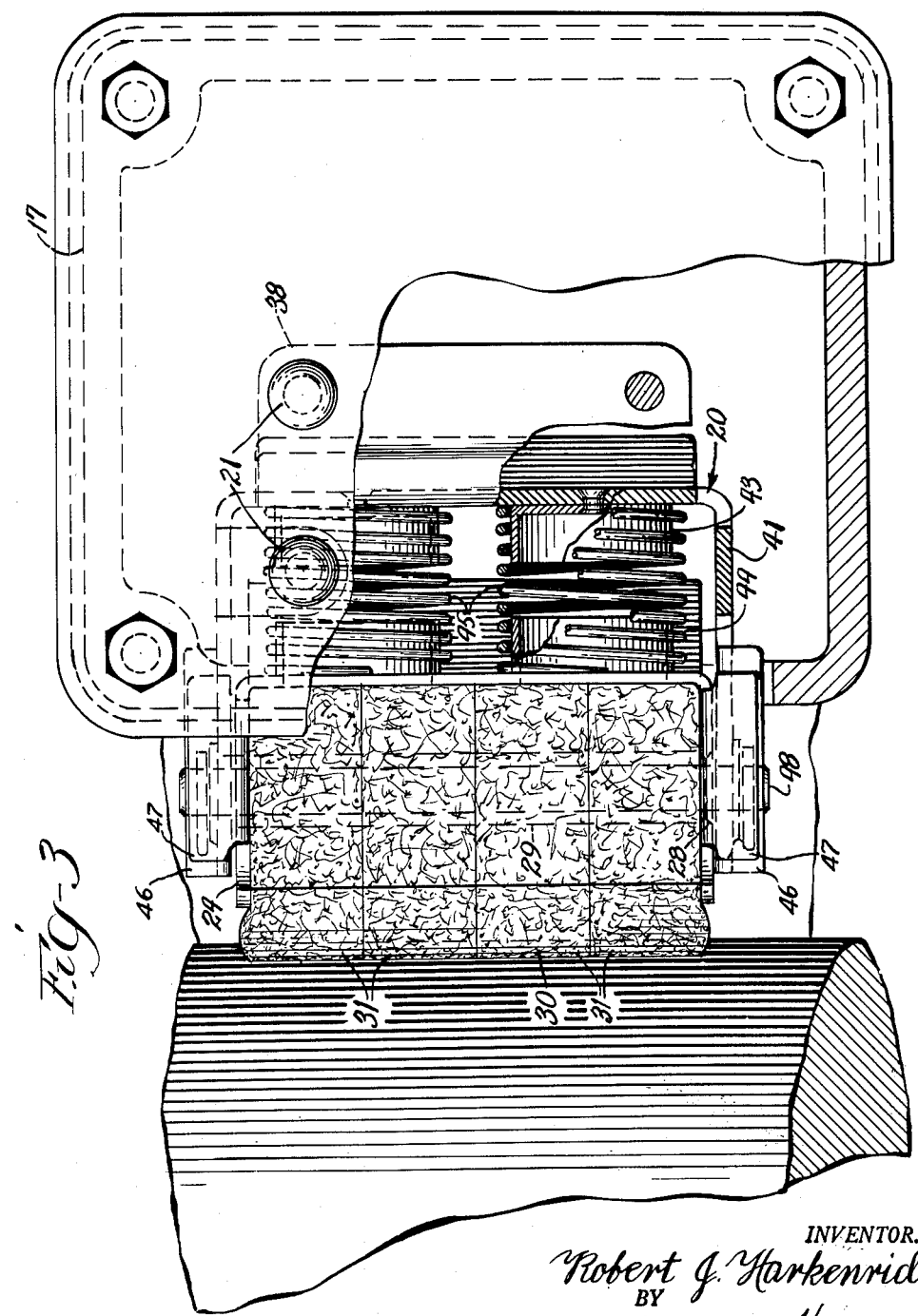
Fig. 3 is a plan view of the device shown in Fig. 1 looking in the direction of the arrow 3 in that figure.

The side members of the base and side walls of the trough are flanged to form interengaging guides 46 and 47, which telescope as best shown in Fig. 2 when the parts are assembled for use.

The group of felt bodies 30 assembled on the bushing 29 between the side walls of the trough are secured in place by a pivot pin 48 which extends through the bushing and through the elongated openings 23 in the side members of the base and are made fast by pins 49 and washers 50.

The lubricator is assembled by passing the bushing 29 through the group of felt bodies 30, inserting that subassembly in the trough between the side pieces 26, and upsetting the reduced ends 28 of the bushing in the openings 27. The applicator unit thus formed is inserted into the base between the side members 26 against the springs 45, and the pivot pin 48 is passed through the bushing 29 and made fast by the pins 49 and washers 50.

In the main, that assembly will be in one with the cover plate 17 by reason of the base having been riveted to it. The felt bodies are suitably impregnated and the whole unit encased within a dust proof and leak proof envelope for protection during storage and handling until the device is to be installed in an axle cap or motor suspension bearing cap.

That application is made by lowering the lubricator through the inspection opening 16 until the cover plate 17 comes approximately against the top of the cap, and then moving it to proper position indicated in Fig. 1 and inserting the bolts 18.

By the assembly described, it is assured that by the simple operation described the felt bodies are put in position to raise the oil from the reservoir and apply it through the curved surfaces 32 to the axle 12, an important advantage in service. Installations are often made without care or skill.

The pivot pin 48 in the slots 23 allows ample movement to accommodate vibrations and wear but protects the axle against the side walls 26 of the trough ever coming against the axle.

In this particular embodiment made to fit General Electric 761-A traction motor axle cap, which has an unusually small window opening, the base and trough are made from sheet metal and the side members 22 are spaced 3.875" to receive the side walls 26 spaced 3.812". The belt bodies project ½" from the adjacent edges of the side walls 26, and fan out under pressure and use. This has been found sufficient to afford ample lubrication.

I claim:

1. In a lubricator for traction motor suspension bearings of diesel locomotives, a base having a leg adapted to be made fast to a support, spaced side members projecting from said base having arms also adapted to be made fast to a support, there being aligned slots in the side members, a trough for holding a lubricating body including a back and spaced side walls between the side members of the base, interengaging guides on said side members and said side walls, resilient means between the base and the trough, and a limit pin carried by the trough and located in the aligned slots in the side members.

2. In a lubricator for traction motor suspension bearings of diesel locomotives, a base having a leg adapted to be made fast to a support, spaced side members projecting from said base having arms also adapted to be made fast to a support, a trough for holding a lubricating body including a back and spaced side walls between the side members of the base, mating guide flanges on said side members of the base and the side walls of the trough, a porous lubricating body in the trough between the side walls, and resilient means between the base and the trough.

3. In a lubricator for traction motor suspension bearings of diesel locomotives, a base having a leg adapted to be made fast to a support, spaced side members projecting from said base having arms also adapted to be made fast to a support, a trough for holding a lubricating body including a back and spaced side walls between the side members of the base, mating guide flanges on said side members of the base and the side walls of the trough, a porous lubricating body in the trough between the side walls, resilient means between the base and the trough, and limit means through the trough and in the base.

4. In a lubricator for traction motor suspension bearings for diesel docomotives, a base having a leg adapted to be made fast to a cover plate of an axle cap and side members projecting from said base each having an arm adapted to be made fast to that cover plate, a trough for a lubricating body including a back and spaced side walls between the side members of the base, telescoping guide flanges on said side members and side walls, spring means urging the trough away from the base, and means to limit the movement of the trough away from the base.

5. A lubricator for a traction motor suspension bearing of a diesel locomotive comprising a base adapted to be mounted in depending relation from an axle cap cover plate, said base comprising a plate of generally U-shaped cross section having a leg extending upwardly from the bottom of the U and an arm projecting upwardly from each of the side members of the U-shaped plate, said arms and leg terminating in a common plane and being adapted to be connected to said cover plate, and a lubricating body positioned between said side members and mounted thereon.

6. In a traction motor suspension bearing of a diesel locomotive, a cap for said bearing providing access to the bearing, a lubricating body support mounted in depending relation from said cap comprising a plate of generally U-shaped cross section having a leg extending upwardly from the bottom of the U and an arm projecting upwardly from each of the side members of the U-shaped plate, said arms and leg terminating in a common plane and being connected to the under side of said cap, and a lubricating body positioned between and carried by said side members.

References Cited in the file of this patent

UNITED STATES PATENTS

| | | |
|---|---|---|
| 915,794 | Pearson | Mar. 23, 1909 |
| 1,575,371 | Lowden | Mar. 2, 1926 |
| 2,540,829 | Miller | Feb. 6, 1951 |